US012621198B2

(12) United States Patent　　(10) Patent No.:　US 12,621,198 B2

Gu et al.　　(45) Date of Patent:　May 5, 2026

(54) HIGH-PRECISION MULTI-PHASE CFR SYSTEM AND METHOD AND USE

(71) Applicants: Chongqing WuQi Microelectronics Co., Ltd., Chongqing (CN); Shanghai WUQI Microelectronics Co., Ltd., Shanghai (CN)

(72) Inventors: Qiang Gu, Chongqing (CN); Jinbang Zong, Chongqing (CN)

(73) Assignee: Chongqing WuQi Microelectronics Co., Ltd., Chongqing (CN)

( * ) Notice: Subject to any disclaimer, the term of this patent is extended or adjusted under 35 U.S.C. 154(b) by 0 days.

(21) Appl. No.: 18/784,622

(22) Filed: Jul. 25, 2024

(65) Prior Publication Data

US 2024/0380648 A1　　Nov. 14, 2024

Related U.S. Application Data

(63) Continuation of application No. PCT/CN2022/108580, filed on Jul. 28, 2022.

(30) Foreign Application Priority Data

Jan. 27, 2022　(CN) .......................... 202210099158.3

(51) Int. Cl.
H04L 27/26　　(2006.01)
(52) U.S. Cl.
CPC ................................ H04L 27/2623 (2013.01)
(58) Field of Classification Search
CPC ............. H04L 27/2623; H04L 27/2624; H04L 27/2614; H04B 2201/70706; H04B 1/0475
See application file for complete search history.

(56) References Cited

U.S. PATENT DOCUMENTS 9,077,408 B1 * 7/2015 Sapuan Sahori ... H04L 27/2624
9,160,594 B1 * 10/2015 Copeland ............ H04L 27/2624
(Continued)

FOREIGN PATENT DOCUMENTS

CN　　102970266 A　　3/2013
CN　　102075484 B　*　4/2015
CN　　104601511 A　　5/2015

OTHER PUBLICATIONS

Hemphill et al., "Peak Cancellation Crest Factor Reduction Reference Design," Xilinx, XAPP1033 (v1.0), Nov. 18, 2007 (Year: 2007).*

*Primary Examiner* — Sophia Vlahos
(74) *Attorney, Agent, or Firm* — JEEN IP LAW, LLC

(57) ABSTRACT

This application discloses a high-precision multi-phase CFR system and method and use. This application relates to the technical field of PAPR reduction. The CFR system is a single-stage multi-phase structure, which is used for an input signal to perform peak searching and phase recording at a high rate, and to perform peak screening, peak allocation and peak cancellation at a single rate; in the cancellation signal generation, the peak noise after the peak screening is pulse shaped and compensated for the recorded phases at the high rate by multi-phase CPG coefficients; and according to the peak allocation, multiple CPG pulse signals are combined to obtain a final cancellation signal; then a delayed original signal and the final cancellation signal are subtracted to obtain a low-PAPR signal for output.

2 Claims, 4 Drawing Sheets

(56) References Cited

U.S. PATENT DOCUMENTS

| | | | |
|---|---|---|---|
| 9,455,860 B2* | 9/2016 | Feng | H04L 27/2623 |
| 10,212,013 B2* | 2/2019 | Qiu | H04W 72/0453 |
| 10,367,670 B2* | 7/2019 | Wang | H04L 27/2623 |
| 11,956,111 B2* | 4/2024 | Shih | H04L 5/001 |
| 2014/0140452 A1* | 5/2014 | Gandhi | H03F 1/3241 |
| | | | 375/346 |
| 2016/0028574 A1* | 1/2016 | Wang | H04L 27/367 |
| | | | 375/296 |
| 2017/0026216 A1* | 1/2017 | Zhao | H04L 5/005 |
| 2017/0187550 A1* | 6/2017 | Kim | H04L 25/02 |

* cited by examiner

HIGH-PRECISION MULTI-PHASE CFR SYSTEM AND METHOD AND USE

CROSS-REFERENCE TO RELATED APPLICATIONS

The application claims priority to Chinese patent application No. 202210099158.3, filed on Jan. 27, 2022, the entire contents of which are incorporated herein by reference.

TECHNICAL FIELD

This application relates to the field of PAPR reduction, and specifically, to a high-precision multi-phase CFR system and method and use.

BACKGROUND

Compared with a single-carrier system, an OFDM (Orthogonal Frequency Division Multiplex) system has multiple orthogonal subcarriers. If the phases of multiple subcarriers are consistent, the instantaneous power of the superimposed signal will be much greater than the average power of the signal, and the PAPR (Peak to Average Power Ratio, also known as PAR) will increase. If the instantaneous power exceeds the dynamic range of the PA (Power Amplifier), it will lead to nonlinear distortion, destroy the orthogonality of the sub-channels, cause mutual interference, and spectrum leakage will seriously affect adjacent channel signals. For example, in WiFi systems, WiFi6 supports higher-order modulation methods, and the unprocessed PAPR can reach 10 dB or even above 11 dB, which has a significant impact on the linear output of the PA. Therefore, before entering the PA, the PAPR of the modulated signal needs to be appropriately suppressed. In the prior art, CFR is usually used to reduce the PAPR, wherein CFR is the abbreviation of Crest Factor Reduction.

Since CFR is a nonlinear process, if limiting is performed directly, it will cause problems such as spectrum leakage and EVM degradation. Therefore, the commonly used methods to reduce PAPR in engineering are the windowing function method (Windowing CFR), Noise Shaping CFR (abbreviated as NS-CFR) and Peak Cancellation CFR (abbreviated as PC-CFR). Among them, the basic principle of the PC-CFR is to use a pulse signal that matches the spectrum characteristics of the original input signal to cancel the peak of the original input signal, thereby achieving the purpose of reducing the PAPR of the signal. Compared with the Windowing CFR and Noise Shaping CFR, the PC-CFR has better peak cancellation performance and controllable resource consumption.

When using the PC-CFR scheme for peak cancellation, processing only at a low rate may result in peak leakage or peak regeneration. Therefore, in order to increase the working rate of CFR, multi-stage cascading or multiple interpolation is usually used for peak cancellation at a high rate to obtain better peak cancellation performance. Referring to a typical peak cancellation algorithm shown in FIG. 1, a fractional delay scheme is used to perform peak search and peak cancellation at a single rate; a multi-stage cascade is used, and a fractional delay is performed on the signal between stages, which is equivalent to increasing the sampling rate of the data. And the internal processing of each stage is the same. As an example, FIG. 1 illustrates the use of a four-stage CFR module cascade, including peak cancellation module 1, peak cancellation module 2, peak cancellation module 3 and peak cancellation module 4. Each stage of CFR modules is connected using fractional delays, including fractional delay 1, fractional delay 2 and fractional delay 3. Assuming that the fractional delays are ½ delay, ¼ delay and ½ delay respectively, this is equivalent to increasing the signal to four times the sampling rate, which can reduce leakage peaks and peak regeneration.

The peak allocation diagram of the signal after the fractional delay is shown in FIG. 2. It can be seen that a higher peak is generated after the fractional delay. This is because due to the limitation of the sampling rate, the real peak may be hidden at a higher rate. At this time, the single rate cannot see it and cannot eliminate the peak. If it is only processed at a low rate, the peak will still appear after high-rate interpolation, causing peak regeneration. By performing fractional time delay on the signal to remove the peak value of pipeline processing, the purpose of high-speed peak search and peak cancellation can be achieved.

At the same time, the prior art also provides a method for reducing PAPR at a high rate at the symbol level. As an example, a method and device for reducing the PAPR of a signal is disclosed in Chinese patent z1200710122825.0, which discloses a method for performing peak cancellation in frequency domain symbols as shown in FIG. 3 and a method for performing peak cancellation in time domain symbols as shown in FIG. 4. By controlling the rotation factor of the frequency domain symbol or the fractional delay of the time domain symbol, and using multi-stage pipeline processing, the purpose of high-rate peak cancellation can be achieved.

However, the above-mentioned several existing CFR processing methods achieve the purpose of peak cancellation at a high rate by pipeline processing at a low rate, which results in the process that requires multiple fractional delays or phase transformations of the data; and after each fractional delay, it is necessary to re-enter the peak compensation module, such as the four-stage cascade CFR structure mentioned above, which requires four times of peak compensation processes. Although a certain accuracy requirement is met, the processing speed is low and the resource overhead is large.

In summary, how to reduce structural redundancy, improve processing speed and reduce resource overhead while ensuring the accuracy of peak searching and peak cancellation is a technical problem that needs to be solved urgently at present.

SUMMARY

The purpose of the application is to overcome the deficiencies of the prior art, and to provide a high-precision multi-phase CFR system and method and use. The application provides a high-precision multi-phase CFR design that employs multi-phase structural processing within a single-stage CFR, which can achieve the same accuracy in peak searching and peak cancellation as a multi-stage fractional delay CFR cascade structure while reducing structural redundancy and effectively reducing resource consumption.

To achieve the above goals, the application provides the following technical solutions. A high-precision multi-phase CFR system for performing crest factor reduction on an input signal to obtain a peak-clipped signal for output, the system includes a main circuit, a branch circuit for generating a peak cancellation signal, and an adder/subtractor module for subtracting the main circuit output signal from the branch circuit output signal. An original input signal is divided into two paths and input into the main circuit and branch circuit respectively. On the main circuit, the original input signal is delayed. On the branch circuit, the original input signal is multi-interpolated to form a plurality of signal data with different phases, and then a maximum magnitude selection is performed at a high rate to obtain a multi-phase peak signal and record the multi-phase phase, then the signal is restored to an original single rate for peak screening, peak allocation and cancellation signal generation. Wherein, in the process of generating the cancellation signal, the peak phase at the high rate is compensated by the multi-phase CPG coefficients at the single rate, and then the multiple CPG pulse signals are combined to obtain a final cancellation signal according to the peak allocation. The adder/subtractor module subtracts the final cancellation signal from the main circuit output signal to obtain the peak-clipped signal for output.

Further, an interpolation module is provided on the branch circuit, and the interpolation module is configured to: when the original input signal with a sampling rate of fs is input into the branch circuit, the input signal is interpolated N times to N*fs sampling rate, and after interpolation, one signal data x(n) becomes N-phase signal data X(Nn), X(Nn+1), . . . , X(Nn+N−1) of different phases, wherein N is an integer greater than or equal to 2, and n, Nn, Nn+1, . . . , Nn+N−1 represent time.

Further, a multi-phase max mag select module is provided on the branch circuit, and the multi-phase max mag select module is configured to: for each signal data x(n), according to the N-phase signal data X(Nn), X(Nn+1), . . . , X(Nn+N−1) obtained after interpolation, compare the magnitudes of these N phases, select a phase with the maximum magnitude from the N phases as a peak point output, and record the phase information of the peak point position; and, form an N-phase peak signal according to the magnitude and phase of the peak points extracted from the N-phase signal data.

Further, a peak screening module is provided on the branch circuit, and the peak screening module is configured to: perform two screenings of the peak in sequence, including an initial screening of the peak and a secondary screening of the peak; the initial screening of the peak is to perform peak selection of the N-phase peak signal by sliding window processing at the original single rate; and the secondary screening of the peak is peak window screening which selects the maximum peak in the window according to the set window length; and, for the peak set obtained after the multi-phase max mag selecting and two peak screenings, retain the magnitude and phase information corresponding to the peak point positions, and set all data at positions other than the peak points to 0 to obtain the final noise set.

Further, a peak allocation module is provided on the branch circuit, and the peak allocation module is configured to: perform filter multiplication allocation on the peaks in the noise set, wherein the number of multipliers is allocated according to the density of the peaks; the filter is used to filter the noise signal to maintain the same spectral characteristics as the original input signal.

Further, a multi-phase CPG coefficients generation module is provided on the branch circuit, and the multi-phase CPG coefficients generation module is configured to: perform a convolution operation on a single-phase CPG coefficient and a multi-phase fractional delay filter to obtain the multi-phase CPG coefficients which include multiple groups of CPG coefficients, each group of CPG coefficient corresponds to a phase; and the multi-phase CPG coefficients are used to process the delay compensation of the multi-phase peak signal acquired at the high rate; the single-phase CPG coefficient is obtained by designing a filter with the same spectrum as the original input signal at the single rate.

Further, When the delay compensation of the multi-phase peak signal acquired at a high rate is processed by the multi-phase CPG coefficients, for the peak noise of different phases, the CPG coefficient of the corresponding phase is used to complete the delay compensation.

Further, for each phase in the multi-phase, a convolution operation is performed between the noise of this phase and the CPG coefficient of this phase to obtain the CPG pulse signal of the phase after delay compensation; according to the peak allocation, the CPG pulse signals of multiple phases are combined to obtain the final cancellation signal.

The application also provides a high-precision multi-phase CFR method, comprising the following steps: inputting an original input signal; dividing the original input signal into two paths and inputting them into a main circuit and a branch circuit respectively; on the main circuit, delaying the original input signal; on the branch circuit, performing multiple interpolations on the original input signal to form multi-phase signal data with different phases, and then performing a maximum magnitude selection at a high rate to obtain a multi-phase peak signal and record the multi-phase phase, then restoring the signal to an original single rate to perform peak screening, peak allocation and cancellation signal generation. Wherein, in the process of generating the cancellation signal, compensating the peak phase at the high rate by the multi-phase CPG coefficients at the single rate, and then combining multiple CPG pulse signals to obtain a final cancellation signal according to the peak allocation; subtracting the final cancellation signal output by the branch circuit from the delayed original signal output by the main circuit to obtain a peak-clipped signal for output.

The application also provides a method for generating a peak cancellation signal in CFR, comprising the following steps: performing multiple interpolations on an original input signal to form multi-phase signal data with different phases; performing a maximum magnitude selection at a high rate to obtain a multi-phase peak signal and record the multi-phase phase; restoring the signal to an original single rate to perform peak screening, peak allocation and cancellation signal generation; wherein, in the process of generating the cancellation signal, compensating the peak phase at the high rate by the multi-phase CPG coefficients at the single rate, and then combining multiple CPG pulse signals to obtain a final cancellation signal according to the peak allocation.

Compared with the prior art, the application has the following advantages and positive effects due to the adoption of the above technical solution, as an example: the high-precision multi-phase CFR scheme adopts multi-phase structural processing within a single-stage CFR, which can achieve the same accuracy in peak searching and peak cancellation as a multi-stage fractional delay CFR cascade structure, while reducing structural redundancy and effectively reducing resource consumption. The application utilizes processing at a low rate to obtain peak cancellation pulses at a high rate. Compared with the existing multi-stage cascade structure of fractional delay CFR, the application improves processing efficiency, reduces structural redundancy, and decreases the resource overhead while ensuring essentially the same accuracy and effectiveness of peak cancellation.

DETAILED DESCRIPTION OF THE EMBODIMENTS

A high-precision multi-phase CFR system and method and use disclosed in the application will be further described in detail below with reference to the accompanying drawings and specific embodiments. It should be noted that the combinations of technical features or technical features described in the following embodiments should not be considered isolated, and they may be combined with each other to achieve better technical results. In the accompanying drawings of the following embodiments, the same symbols appearing in each of the accompanying drawings represent the same features or components that can be applied in different embodiments. Thus, once an item is defined in one of the accompanying drawings, no further discussion of it is required in subsequent drawings.

It should be noted that the structures, proportions, dimensions, etc. shown in the attached drawings of this specification are only for the purpose of understanding and reading by those skilled in the art in accordance with the contents disclosed in this specification, and are not intended to limit the conditions under which the application can be implemented. Any modification of the structure, change of the proportion relationship, or adjustment of the size, without affecting the efficacy and purpose of the application, should fall within the scope of the technical content disclosed by the application. The scope of the preferred embodiments of the application includes alternative implementations in which the functions may be performed out of the order described or discussed, including performing the functions in a substantially simultaneous manner or the reverse order depending upon the functions involved, which should be embodiments of the application will be understood by those skilled in the art to which the embodiments of the application pertain.

Techniques, methods and devices known to those of ordinary skill in the relevant art may not be discussed in detail, but where appropriate, such techniques, methods, and devices should be considered part of the authorized description. In all examples shown and discussed herein, any specific value should be construed as illustrative only and not as limiting. Accordingly, other examples of exemplary embodiments may have different values.

Embodiments

Figure 1:
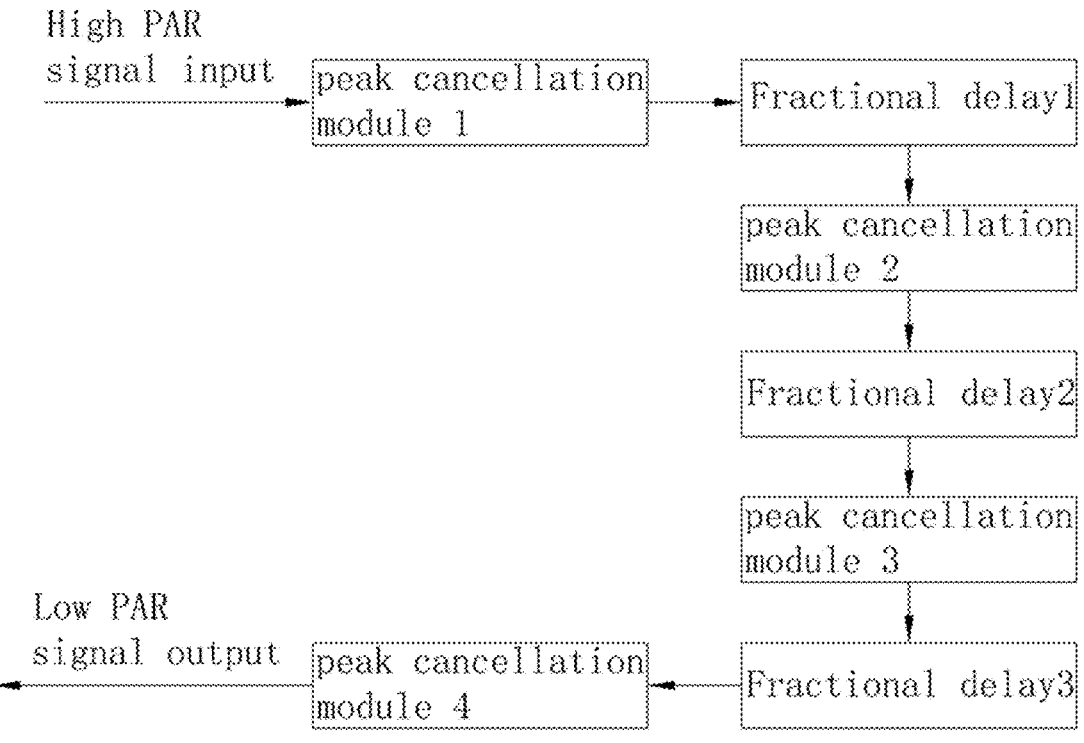
FIG. 1 is a logic diagram of a typical peak cancellation algorithm provided by the prior art.
Figure 2:
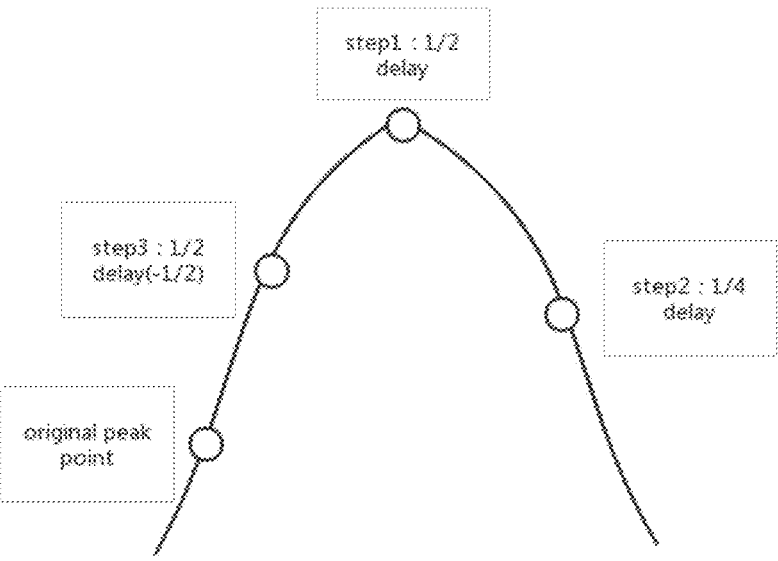
FIG. 2 is a schematic diagram of the peak allocation of a signal after fractional delay.
Figure 3:
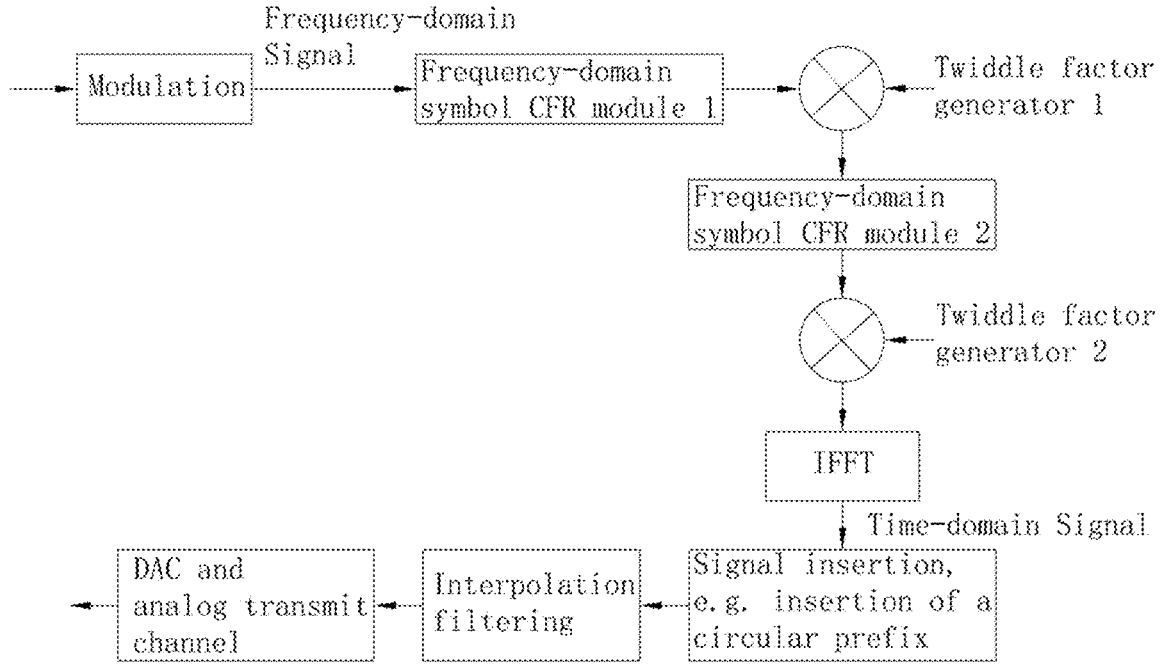
FIG. 3 is a CFR multi-stage cascade solution for performing peak cancellation in frequency domain symbols provided by the prior art.
Figure 4:
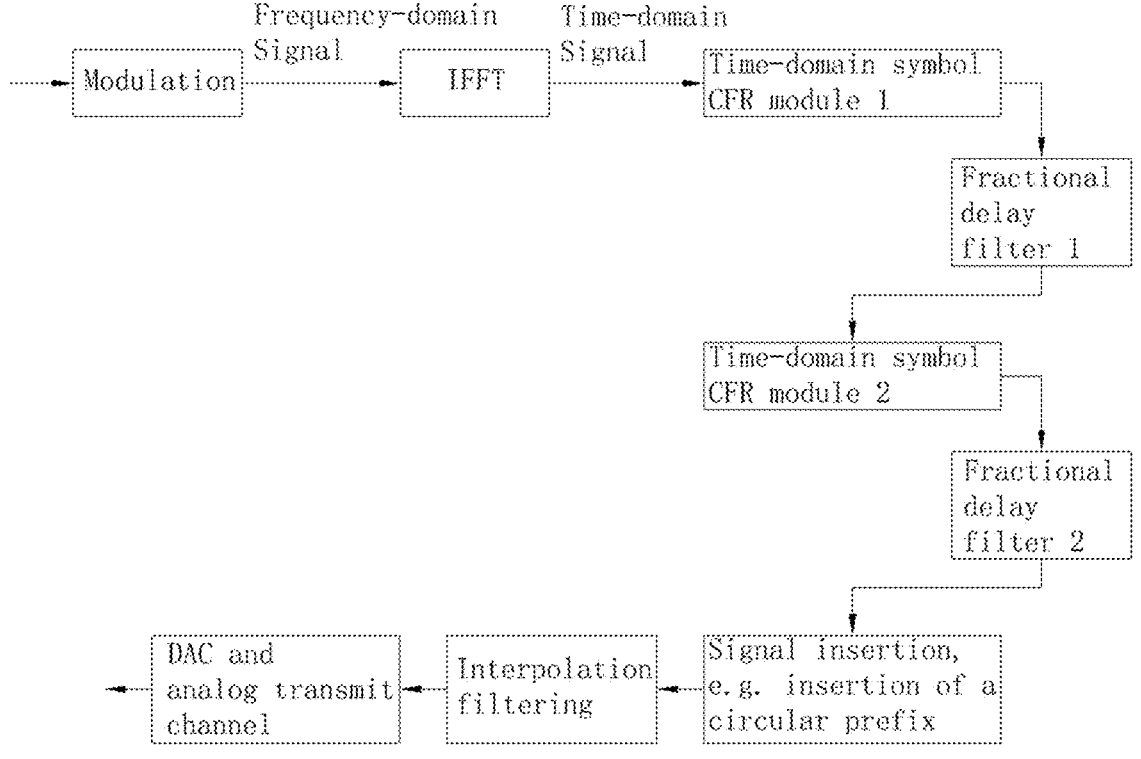
FIG. 4 is a CFR multi-stage cascade solution for performing peak cancellation in time domain symbols provided by the prior art.
Figure 5:
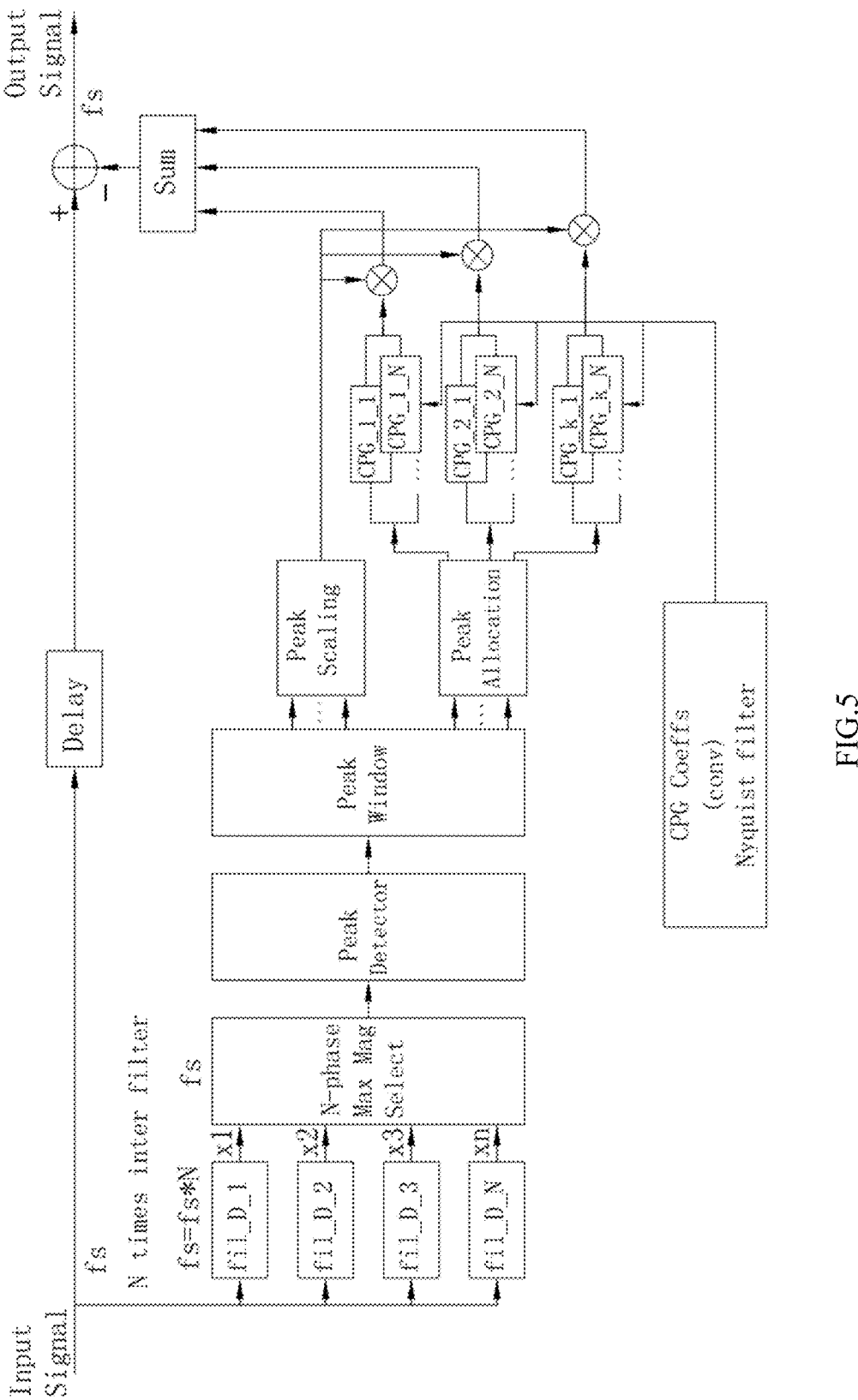
FIG. 5 is a logical diagram of a high-precision multi-phase CFR system provided by the application.

As shown in FIG. 5, a high-precision multi-phase CFR (Crest Factor Reduction) system provided by the present application is shown. The CFR system is used to reduce the crest factor of an input signal to obtain a peak-clipped signal (Output Signal), and output the peak-clipped signal.

The CFR system includes a main circuit, a branch circuit for generating a peak cancellation signal, and an adder/subtractor module for subtracting the main circuit output signal from the branch circuit output signal.

After the original input signal is input into the CFR system, it is divided into two paths and input into the main circuit and branch circuit respectively.

The main circuit only delays the original input signal. Specifically, a delay module is provided on the main circuit, and the delay module is used to perform delay processing on the original input signal.

The branch circuit is used to generate a peak cancellation signal (also known as a peak cancellation pulse). Then, the peak-clipped signal is obtained by subtracting the output signal of the branch circuit from the output signal of the main circuit. The process of generating a peak cancellation signal includes interpolation, peak searching, peak screening, peak allocation, filter multi-phase processing, and cancellation signal generation. Specifically, in the branch circuit, the original input signal is first interpolated multiple times to form signal data of multiple different phases, and then a maximum magnitude selection is performed at a high rate to obtain a multi-phase peak signal and record the multi-phase phase, and then the signal is restored to an original single rate for peak screening, peak allocation and cancellation signal generation. In the process of generating the cancellation signal, compensating the peak phase at the high rate by a multi-phase CPG (Cancel Pulse Generation) coefficient at the single rate, and then multiple CPG pulse signals are combined according to the peak allocation to obtain a final cancellation signal.

The adder/subtractor module is used to subtract the final cancellation signal from the main circuit output signal to obtain a peak-clipped signal for output.

In this embodiment, the branch circuit may be provided with an interpolation module, a multi-phase max mag select module, a peak screening module, a peak allocation module, a multi-phase CPG coefficients generation module and a cancellation signal generation module.

The interpolation module is used to perform N times interpolation. Specifically, the interpolation module is configured to: when the original input signal with a sampling rate of fs is input into the branch circuit, the input signal is interpolated N times to N*fs sampling rate, so that the sampling rate is increased from a single rate to an N times rate. After interpolation, one signal data x(n) becomes N-phase signal data X(Nn), X(Nn+1), . . . , X(Nn+N−1) of different phases, wherein N is an integer greater than or equal to 2, and n, Nn, Nn+1, . . . , Nn+N−1 represent time.

As an example, for N=4, that is, four times interpolation is performed. In this case, x(n) is interpolated to form four data as follows: X(4n), X(4n+1), X(4n+2) and X(4n+3).

The multi-phase max mag select module is used to perform a multi-phase maximum selection after interpolation. Specifically, the multi-phase max mag select module is configured to: for each signal data x(n), according to the N-phase signal data X(Nn), X(Nn+1), . . . , X(Nn+N−1) obtained after interpolation, compare the magnitudes of these N phases, select a phase with the maximum magnitude from the N phases as a peak point output, and record the phase information of the peak point position; and, form an N-phase peak signal according to the magnitude and phase of the peak points extracted from the N-phase signal data.

As an example, still for N=4, for the interpolated values of x(n), X(4n), X(4n+1), X(4n+2) and X(4n+3), the magnitudes of these four phases are compared, and the phase with the maximum magnitude is selected from the four phases for output, such as the X(4n+1) phase. At this time, the X(4n+1) phase is a peak point position, and the magnitude and phase information of the peak point are recorded.

For the four-phase signal data X(4n+4), X(4n+5), X(4n+6) and X(4n+7) formed after interpolation of x(n+1), compare the magnitudes of these four phases, and select the phase with the maximum magnitude from the four phases for output, such as the X(4n+5) phase. At this time, the X(4n+5) phase is a peak point position, and the magnitude and phase information of the peak point are recorded.

By analogy, based on the magnitude and phase of the peak points extracted from the N-phase signal data, an N-phase peak signal that records the magnitude and phase of the peak points on the four phases can be formed, and each peak point retains the peak phase information on the four phases at that time. In this way, it is possible to obtain multi-phase peak signals at a high rate (for N=4, it corresponds to a four times higher sampling rate).

After acquiring the multi-phase peak signal, it is restored to the original single rate, and subsequent processing is performed at the single rate. In this way, the large resource overhead introduced by peak pulse generation at a high rate can be avoided.

The peak screening module is configured to: perform two screenings of the peak in sequence, including an initial screening of the peak and a secondary screening of the peak; the initial screening of the peak is to perform peak selection of the N-phase peak signal by sliding window processing at the original single rate; and the secondary screening of the peak is peak window screening which selects the maximum peak in the window according to the set window length; and, for the peak set obtained after the multi-phase max mag selecting and two peak screenings, retain the magnitude and phase information corresponding to the peak point positions, and set all data at positions other than the peak points to 0 to obtain the final noise set.

The peak allocation module is configured to: perform filter multiplication allocation on the peaks in the noise set, wherein the number of multipliers is allocated according to the density of the peaks; the filter is used to filter the noise signal to maintain the same spectral characteristics as the original input signal.

The multi-phase CPG coefficients generation module is configured to: perform a convolution operation on a single-phase CPG coefficient and a multi-phase fractional delay filter to obtain the multi-phase CPG coefficients which include multiple groups of CPG coefficients, each group of CPG coefficient corresponds to a phase, and the multi-phase CPG coefficients are used to process the delay compensation of the multi-phase peak signal acquired at the high rate.

The single-phase CPG coefficient is obtained by designing a filter with the same spectrum as the original input signal at the single rate.

When the delay compensation of the multi-phase peak signal acquired at the high rate is processed by the multi-phase CPG coefficients, for the peak noise of different phases, the CPG coefficient of the corresponding phase is used to complete the time delay compensation.

The cancellation signal generation module is configured to: for each phase in the multi-phase, convolution operation is performed on the noise on each phase and the CPG coefficient of the phase to obtain the CPG pulse signal of the phase after delay compensation; and according to peak allocation, the CPG pulse signals of multiple phases are combined to obtain the final cancellation signal.

Figure 6:
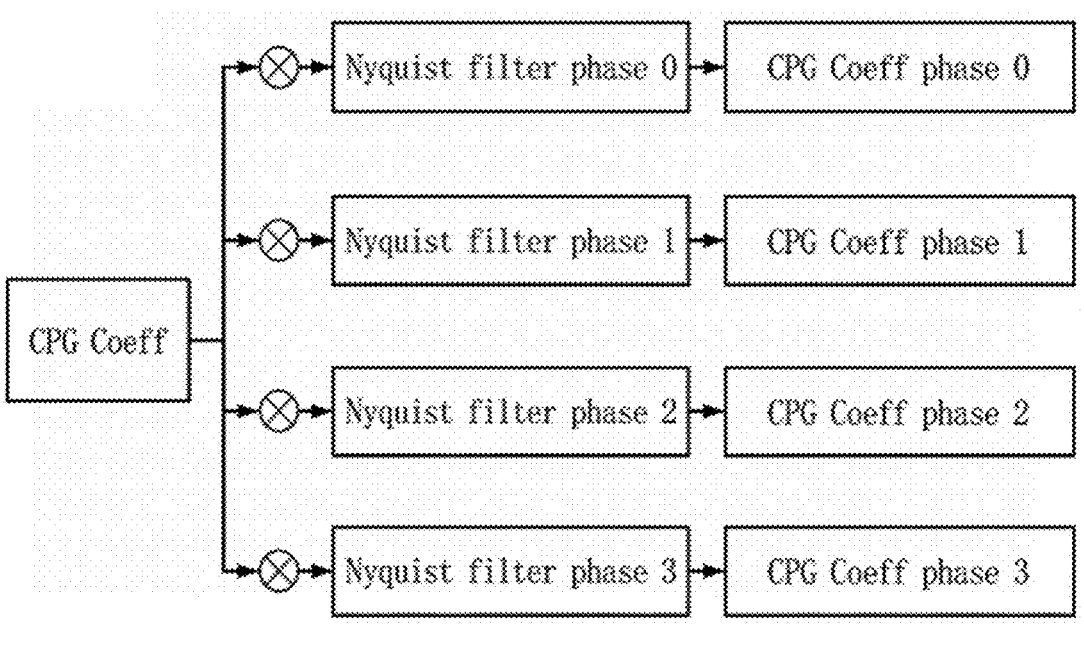
FIG. 6 is a schematic diagram of a flow chart generating four-phase CPG coefficients by the application.
Figure 7:
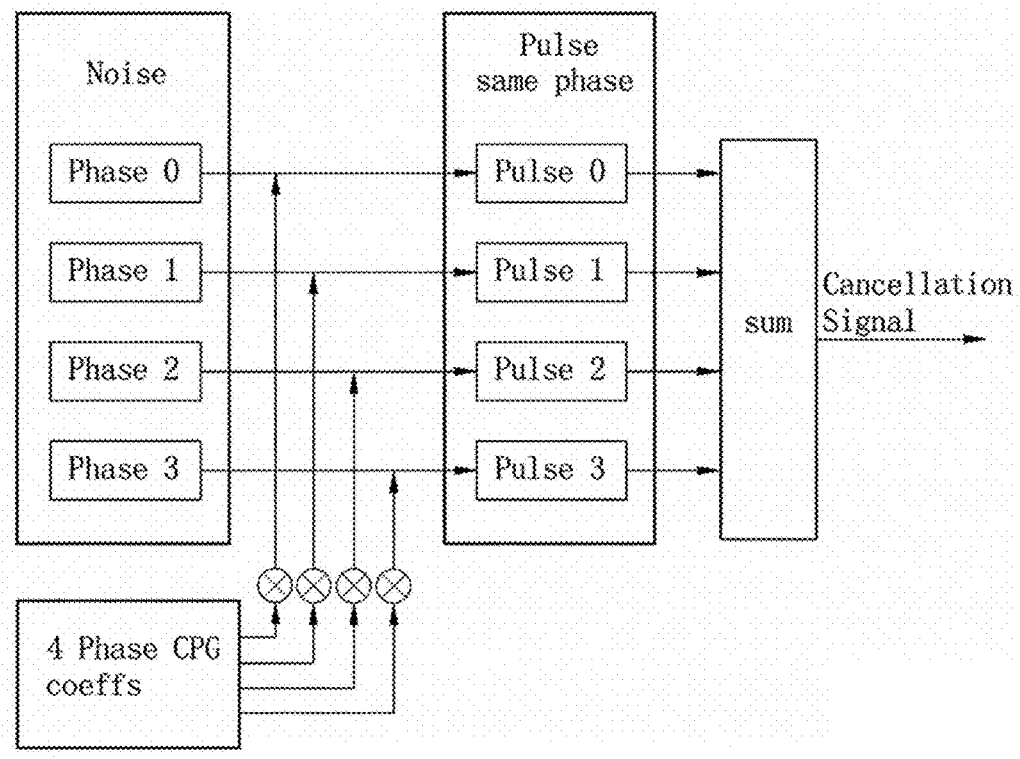
FIG. 7 is a schematic diagram of a flow chart of performing delay compensation and cancellation signal generation in four phases by the application.

As shown in FIG. 5 to FIG. 7, this embodiment is described in detail by taking a four-phase CFR system as an example.

Step S1, interpolation.

The input signal data is interpolated to N*fs sampling rate, wherein fs is the original data sampling rate. For N=4, the interpolated sampling rate is 4*fs, i.e., four times the sampling rate.

Step S2, N-phase max mag selection after interpolation.

After interpolation, one data becomes N data with different phases. It is necessary to select a phase with the maximum magnitude from the N phases and record the phase information. Taking four times interpolation as an example, one signal data x(n) is interpolated into X(4n), X(4n+1), X(4n+2), and X(4n+3), compare the magnitudes of these four phases and select the phase position with the maximum magnitude for output, and record the phase information.

Step S3, rate restoration.

The signal after the multi-phase max mag selecting is extracted and restored to the original single rate, and subsequent processing is still performed at the single rate, because the generation of peak pulses at a high rate is not conducive to hardware implementation and has a large resource overhead.

Step S4: Peak Detector.

An initial screening of the peak is performed in this step. Specifically, the peak selection of the data stream is performed by sliding window processing at the single rate.

Step S5: Peak Window screening.

According to the set window length, the maximum peak in the window is selected for secondary screening of the peak.

The purpose of the two peak screenings is to prevent too many peaks from being detected, which will lead to excessive peak cancellation, and resulting in EVM degradation and peak regeneration, as well as excessive use of multiplier resources.

Step S6: peak noise storage.

For the peak set obtained after the multi-phase max mag selection and two peak screenings, retaining the magnitude and phase information corresponding to the peak point positions, and the data at positions other than the peak points are all set to 0.

Step S7: Peak Allocation.

After peak screening, the final noise set is obtained. The noise signal in the noise set needs to be filtered to maintain the same spectral characteristics as the original input signal, thereby reducing the spectrum diffusion caused by nonlinear distortion.

Peak allocation is to perform the multiplication distribution of filters on the peaks in the noise set. Wherein, according to the form of the data stream, it is necessary to reasonably distribute multiplication according to the density of peaks. For a single peak, the convolution of data and filter coefficients is equivalent to the complex multiplication of peak data and the central tap of coefficients. For multiple peaks within the convolution length, the output of the peak point is equivalent to the accumulation of multiple complex multiplications within the filter length. The number of multipliers used is related to the density of the peaks. The most densely packed peak area determines the maximum number of multipliers to be allocated.

Step S8, generating multi-phase CPG coefficients.

The multi-phase CPG coefficients are used for two functions: noise shaping and delay compensation. Wherein, noise shaping refers to designing a filter with the same spectrum as the original signal at the single rate to obtain a single-phase CPG coefficient.

The multi-phase CPG coefficients (also known as CPG Coeffs) refer to the convolution (also known as conv) of the single-phase CPG coefficient and N-phase fractional delay filters to obtain CPG coefficients on N phases, which are used to process the delay compensation of multi-phase peak signals obtained at the high rate.

Taking the generation of four-phase CPG coefficients as an example, after generating a single-phase CPG coefficient, it is necessary to obtain the multi-phase CPG coefficients through fractional delay, which is generally processed with the Nyquist filter; the four phases of the Nyquist filter are extracted, and convolved with the single-phase CPG coefficients, respectively, to obtain four sets of coefficients corresponding to the four phases of the Nyquist filter. As shown in FIG. 6, after the single-phase CPG coefficient is generated, fractional delay processing is performed through a fractional delay filter to extract the four phases of the Nyquist filter, such as the Nyquist filter phase 0, Nyquist filter phase 1, Nyquist filter phase 2, and Nyquist filter phase 3 in FIG. 6. Then, they are convolved with the single-phase CPG coefficient respectively to obtain the four-phase CPG coefficients. The four-phase CPG coefficients include four groups of coefficients, such as the CPG Coeff phase 0, CPG Coeff phase 1, CPG Coeff phase 2, and CPG Coeff phase 3 in FIG. 6, which correspond to the aforementioned four phases respectively.

Step S9: delay compensation, and cancellation signal generation.

Although the peak set is at a single rate, each peak point retains the phase information of the multiple phases at that time. When performing noise shaping, for noises of different phases, the CPG Coeff of the corresponding phase needs to be used to complete the delay compensation, so that the generated cancellation signal can be directly subtracted from the original input signal.

The schematic diagram of the delay compensation of four-phase noise is shown in FIG. 7. The noise on the four phases and the four-phase CPG coefficients (CPG Coeffs) are convolved to obtain the pulse signals after delay compensation, wherein the peak value and the CPG coefficient of the corresponding phase are convolved, for example, the peak value of the Nth phase selects the CPG coefficient of the N-phase.

Then, according to the peak allocation, the CPG cancellation signals of the four phases (phase 0, phase 1, phase 2, phase 3) are combined (sum) to obtain the final cancellation signal.

Step S10, the delayed original input signal output by the main circuit minus the final cancellation signal output by the branch circuit, to obtain a peak-clipped signal (Output Signal) for output.

The multi-phase peak cancellation scheme provided by the application is a peak cancellation CFR system with a single-stage multi-phase structure. Through the peak search technology on multi-phases and the generation and processing technology of multi-phase CPG coefficients, multi-phase peak cancellation pulse generation is realized on a single-stage structure. Specifically, the input signal is subjected to multi-phase peak searching and phase recording at a high rate, and peak screening, peak allocation and peak cancellation are performed at a single rate. During the cancellation signal generation, the peak noise after peak screening is pulse-shaped and the recording phase at a high rate is compensated through multi-phase CPG coefficients, and according to the peak allocation, multiple CPG pulses are combined to obtain the final cancellation signal; the original signal is delayed and subtracted from the final cancellation signal to obtain a low peak-to-average ratio signal for output. In this way, the application can utilize processing at a low rate to obtain peak-cancelling pulses at a high rate. Compared with the four-stage cascade method of fractional delay CFR, the present application only uses one-stage processing, and through a four-phase structure and technology, it can achieve a peak clipping effect similar to that at a high rate at a single rate, and does not require multiple fractional delay cascades, thereby ensuring high-precision peak clipping, reducing structural redundancy, and reducing resource overhead.

Another embodiment of the present application further provides a high-precision multi-phase CFR method, which includes the following steps.

S100, inputting an original input signal.

S200, dividing the original input signal into two paths and inputting them into a main circuit and a branch circuit respectively; on the main circuit, delaying the original input signal; on the branch circuit, performing multiple interpolations on the original input signal to form multi-phase signal data with different phases, and then performing a maximum magnitude selection at a high rate to obtain a multi-phase peak signal and record the multi-phase phase, then restoring the signal to an original single rate to perform peak screening, peak allocation and cancellation signal generation; wherein, in the process of generating the cancellation signal, compensating the peak phase at the high rate by the multi-phase CPG coefficients at the single rate, and then combining multiple CPG pulse signals to obtain a final cancellation signal according to the peak allocation.

S300, subtracting the final cancellation signal output by the branch from the delayed original signal output by the main circuit to obtain a peak-clipping signal for output.

In this embodiment, corresponding to step S200, the branch circuit may be provided with an interpolation module, a multi-phase max mag select module, a peak screening module, a peak allocation module, a multi-phase CPG coefficients generation module and a cancellation signal generation module.

The interpolation module is used to perform N times interpolation. Specifically, the interpolation module is configured to: when the original input signal with a sampling rate of fs is input into the branch circuit, the input signal is interpolated N times to N*fs sampling rate, so that the sampling rate is increased from a single rate to an N times rate. After interpolation, one signal data $x(n)$ becomes N-phase signal data $X(Nn), X(Nn+1), \ldots, X(Nn+N-1)$ of different phases, wherein N is an integer greater than or equal to 2, and n, Nn, Nn+1, ..., Nn+N-1 represent time.

The multi-phase max mag select module is used to perform a multi-phase maximum selection after interpolation. Specifically, the multi-phase max mag select module is configured to: for each signal data $x(n)$, according to the N-phase signal data $X(Nn), X(Nn+1), \ldots, X(Nn+N-1)$ obtained after interpolation, compare the magnitudes of these N phases, select a phase with the maximum magnitude from the N phases as a peak point output, and record the phase information of the peak point position; and, form an N-phase peak signal according to the magnitude and phase of the peak points extracted from the N-phase signal data.

After acquiring the multi-phase peak signal, it is restored to the original single rate, and subsequent processing is performed at the single rate. In this way, the large resource overhead introduced by peak pulse generation at a high rate can be avoided.

The peak screening module is configured to: perform two screenings of the peak in sequence, including an initial screening of the peak and a secondary screening of the peak; the initial screening of the peak is to perform peak selection of the N-phase peak signal by sliding window processing at the original single rate; and the secondary screening of the peak is peak window screening which selects the maximum peak in the window according to the set window length; and, for the peak set obtained after the multi-phase max mag selecting and two peak screenings, retain the magnitude and phase information corresponding to the peak point positions, and set all data at positions other than the peak points to 0 to obtain the final noise set.

The peak allocation module is configured to: perform filter multiplication allocation on the peaks in the noise set, wherein the number of multipliers is allocated according to the density of the peaks; the filter is used to filter the noise signal to maintain the same spectral characteristics as the original input signal.

The multi-phase CPG coefficients generation module is configured to: perform a convolution operation on a single-phase CPG coefficient and a multi-phase fractional delay filter to obtain the multi-phase CPG coefficients which include multiple groups of CPG coefficients, each group of CPG coefficient corresponds to a phase, and the multi-phase CPG coefficients are used to process the delay compensation of the multi-phase peak signal acquired at the high rate.

The single-phase CPG coefficient is obtained by designing a filter with the same spectrum as the original input signal at the single rate. When the delay compensation of the multi-phase peak signal acquired at the high rate is processed by the multi-phase CPG coefficients, for the peak noise of different phases, the CPG coefficient of the corresponding phase is used to complete the time delay compensation.

The cancellation signal generation module is configured to: for each phase in the multi-phase, a convolution operation is performed on the noise on each phase and the CPG coefficient of the phase to obtain the CPG pulse signal of the phase after delay compensation; and according to peak allocation, the CPG pulse signals of multiple phases are combined to obtain the final cancellation signal.

Other technical features are described in the previous embodiment, which will not be reiterated here.

Another embodiment of the present application provides a method for generating a peak cancellation signal in a CFR.

The method comprises the following steps: performing multiple interpolations on an original input signal to form multi-phase signal data with different phases; performing a maximum magnitude selection at a high rate to obtain a multi-phase peak signal and record the multi-phase phase; restoring the signal to the original single rate to perform peak screening, peak allocation and cancellation signal generation; wherein, in the process of generating the cancellation signal, compensating the peak phase at the high rate by the multi-phase CPG coefficients at the single rate, and then combining multiple CPG pulse signals to obtain a final cancellation signal according to the peak allocation.

Other technical features are described in the previous embodiment, which will not be reiterated here.

In the above description, the disclosure of the application is not intended to limit itself in these respects. Rather, the various components may be selectively and operatively combined in any number within the intended scope of this disclosure. The steps of the methods or algorithms described in conjunction with the embodiments disclosed herein may be implemented directly using hardware, a software module executed by a processor, or a combination of the two. The software module can be placed in random access memory (RAM), memory, read-only memory (ROM), electrically programmable ROM, electrically erasable programmable ROM, registers, hard disk, removable disk, CD-ROM, or any other form of storage medium known in the technical field. Additionally, terms like "comprising", "including" and "having" should by default be construed as inclusive or open, rather than exclusive or closed, unless explicitly defined to the contrary. All technical, scientific or other terms have the meaning as understood by those skilled in the art unless they are defined to the contrary. Common terms found in dictionaries should not be interpreted too ideally or too practically in the context of related technical documents unless this disclosure explicitly defines them as such. Any changes and modifications made by those of ordinary skill in the field of the application according to the above disclosure fall within the protection scope of the claims.

What is claimed is:

1. A high-precision multi-phase Crest Factor Reduction (CFR) system for performing crest factor reduction on an input signal to obtain a peak-clipped signal for output, the system includes a main circuit, a branch circuit for generating a peak cancellation signal, and an adder/subtractor module;

an original input signal is divided into two paths and input into the main circuit and branch circuit respectively;

on the main circuit, the original input signal is delayed to generate a main circuit output signal;

the branch circuit is provided with an interpolation module, a multi-phase max mag select module, a peak screening module, a peak allocation module, a multi-phase Cancel Pulse Generation (CPG) coefficients generation module and a cancellation signal generation module;

the adder/subtractor module subtracts the peak cancellation signal from the main circuit output signal to obtain the peak-clipped signal for output;

wherein, the interpolation module is configured to: when the original input signal with a sampling rate of fs is input into the branch circuit, the original input signal is interpolated N times to N*fs sampling rate, fs is an original data sampling rate, and after interpolation, one signal data x (n) becomes N-phase signal data X(Nn), X(Nn+1), . . . . X(Nn+N-1) of different phases, wherein N is an integer greater than or equal to 2, and n, Nn, Nn+1, . . . . Nn+N-1 represent time;

the multi-phase max mag select module is configured to: for each signal data x(n), according to the N-phase signal data X(Nn), X(Nn+1), . . . . X(Nn+N-1) obtained after interpolation, compare the magnitudes of these N phases, select a phase with the maximum magnitude from the N phases as a peak point output, and record the phase information of the peak point position; and, form an N-phase peak signal according to the magnitude and phase of the peak point extracted from the N-phase signal data;

the peak screening module is configured to: perform two peak screenings in sequence, including an initial peak screening and a secondary peak screening; the initial peak screening is to perform peak detection of the N-phase peak signal by sliding window processing; and the secondary peak screening is peak window screening which selects a maximum peak in the window according to a set window length, after two peak screenings, obtain a maximum peak set which contains multiple maximum peaks; and, store peak noise, which includes: retain magnitude and phase information corresponding to maximum peak points, and set all data at positions other than the maximum peak points to 0 to obtain a noise set, the noise set corresponding to a noise signal;

the peak allocation module is configured to: perform filter multiplication allocation on the maximum peaks in the noise set, wherein, a number of multipliers is allocated according to a density of the maximum peaks in the noise set; a filter is used to filter the noise signal to maintain the same spectral characteristics as the original input signal;

the multi-phase CPG coefficients generation module is configured to: perform a convolution operation on a single-phase CPG coefficient and a multi-phase fractional delay filter to obtain multi-phase CPG coefficients including multiple groups of CPG coefficients, each group of CPG coefficient corresponds to a phase; the single-phase CPG coefficient is obtained by designing a filter with a same spectrum as the original input signal at the rate fs;

the cancellation signal generation module is configured to: for noise of different phases within the noise set, perform a convolution operation on the noise and a CPG coefficient of the corresponding phase to obtain a CPG pulse signal of this phase after delay compensation; and according to peak allocation, the CPG pulse signals of multiple phases are combined to obtain the peak cancellation signal.

2. A high-precision multi-phase Crest Factor Reduction (CFR) method, comprising:

inputting an original input signal;

dividing the original input signal into two paths and inputting them into a main circuit and a branch circuit respectively; on the main circuit, delaying and outputting the original input signal; on the branch circuit, processing the original input signal to generate a peak cancellation signal subtracting the peak cancellation signal output by the branch circuit from the delayed original signal output by the main circuit to obtain a peak-clipped signal for output;

wherein, generating the peak cancellation signal comprises:

step 1, interpolation: when the original input signal with a sampling rate of fs is input into the branch circuit, the original input signal is interpolated N times to N*fs sampling rate, fs is an original data sampling rate, and after interpolation, one signal data x(n) becomes N-phase signal data X(Nn), X(Nn+1), . . . . X(Nn+N-1) of different phases, wherein N is an integer greater than or equal to 2, and n, Nn, Nn+1, Nn+N-1 represent time;

step 2, multi-phase max mag selection: for each signal data x (n), according to the N-phase signal data X(Nn), X(Nn+1), . . . . X(Nn+N-1) obtained after interpolation, compare the magnitudes of these N phases, select a phase with the maximum magnitude from the N phases as a peak point output, and record the phase information of the peak point position; and, form an N-phase peak signal according to the magnitude and phase of the peak point extracted from the N-phase signal data;

step 3, peak screening: perform two peak screenings in sequence, including an initial peak screening and a secondary peak screening; the initial peak screening is to perform peak detection of the N-phase peak signal by sliding window processing; and the secondary peak screening is peak window screening which selects a maximum peak in the window according to a set window length, after two peak screenings, obtain a maximum peak set which contains multiple maximum peaks; and, store peak noise, which includes: retain magnitude and phase information corresponding to maximum peak points, and set all data at positions other than the maximum peak points to 0 to obtain a noise set, the noise set corresponding to a noise signal;

step 4, peak allocation: perform filter multiplication allocation on the maximum peaks in the noise set, wherein, a number of multipliers is allocated according to a density of the maximum peaks in the noise set; a filter is used to filter the noise signal to maintain the same spectral characteristics as the original input signal;

step 5, generating multi-phase CPG coefficients: perform a convolution operation on a single-phase CPG coefficient and a multi-phase fractional delay filter to obtain multi-phase CPG coefficients including multiple groups of CPG coefficients, each group of CPG coefficient corresponds to a phase; the single-phase CPG coefficient is obtained by designing a filter with a same spectrum as the original input signal at the rate fs;

step 6, delay compensation and cancellation signal generation: for noise of different phases within the noise set, perform a convolution operation on the noise and a CPG coefficient of the corresponding phase to obtain a CPG pulse signal of this phase after delay compensation, the CPG pulse signals of multiple phases are combined to obtain the peak cancellation signal.

* * * * *